United States Patent [19]

Verstijnen

[11] Patent Number: 5,733,147
[45] Date of Patent: Mar. 31, 1998

[54] SIM CARD CONNECTOR

[75] Inventor: Renoldus Jacobus Joseph Maria Verstijnen, Boxtel, Netherlands

[73] Assignee: The Whitaker Corporation, Wilmngton, Del.

[21] Appl. No.: 750,156

[22] PCT Filed: May 22, 1995

[86] PCT No.: PCT/IB95/00388

§ 371 Date: Nov. 27, 1996

§ 102(e) Date: Nov. 27, 1996

[87] PCT Pub. No.: WO95/35550

PCT Pub. Date: Dec. 28, 1995

[30] Foreign Application Priority Data

Jun. 20, 1994 [GB] United Kingdom ............ 9412358

[51] Int. Cl.⁶ .................................................. H01R 13/00
[52] U.S. Cl. ............................ 439/630; 235/441; 439/629
[58] Field of Search ........................... 439/60, 260, 629, 439/630; 235/411

[56] References Cited

U.S. PATENT DOCUMENTS

| | | | |
|---|---|---|---|
| 4,902,233 | 2/1990 | Maillot | 439/630 |
| 5,012,078 | 4/1991 | Pernet | 235/441 |
| 5,257,414 | 10/1993 | Trahan et al. | 235/441 |
| 5,259,777 | 11/1993 | Schuder et al. | 439/630 |
| 5,269,707 | 12/1993 | Reichardt et al. | 439/630 |
| 5,320,552 | 6/1994 | Reichardt et al. | 439/331 |
| 5,586,890 | 12/1996 | Braun | 439/630 |

FOREIGN PATENT DOCUMENTS

| | | | |
|---|---|---|---|
| 0 444 396 A1 | 4/1991 | European Pat. Off. | G06K 7/06 |
| 4030196 A1 | 3/1992 | Germany . | |
| WO92/04688 | 3/1992 | WIPO | G06K 7/06 |
| WO94/15313 | 7/1994 | WIPO . | |
| WO94/27244 | 11/1994 | WIPO | G06K 7/06 |

*Primary Examiner*—J. J. Swann
*Attorney, Agent, or Firm*—Driscoll A. Nina

[57] ABSTRACT

A SIM card connector (2) comprises a housing (4) and two sets (8, 10) of terminals (6). The terminal sets (8, 10) are held together by overmoulded support portions (18) which are then mounted to receiving cavities (44) of the housing (4). The terminals (6) are interleaved and angled for a compact disposition for electrical connection to parallel rows of aligned SIM card contact pads. Sides (52, 54) of the outer periphery (50) of the housing (4) are inclined at the same angle as the terminals (6) such than a small connector surface are is provided. The principal advantage is therefore minimum surface area requirements when mounted to a PC Board. Further advantages are the few number of parts, and simple, reliable and cost-effective design.

6 Claims, 1 Drawing Sheet

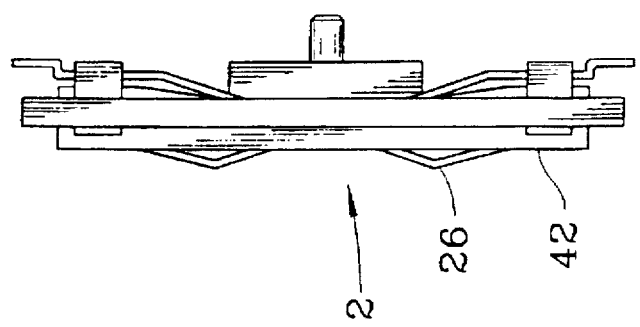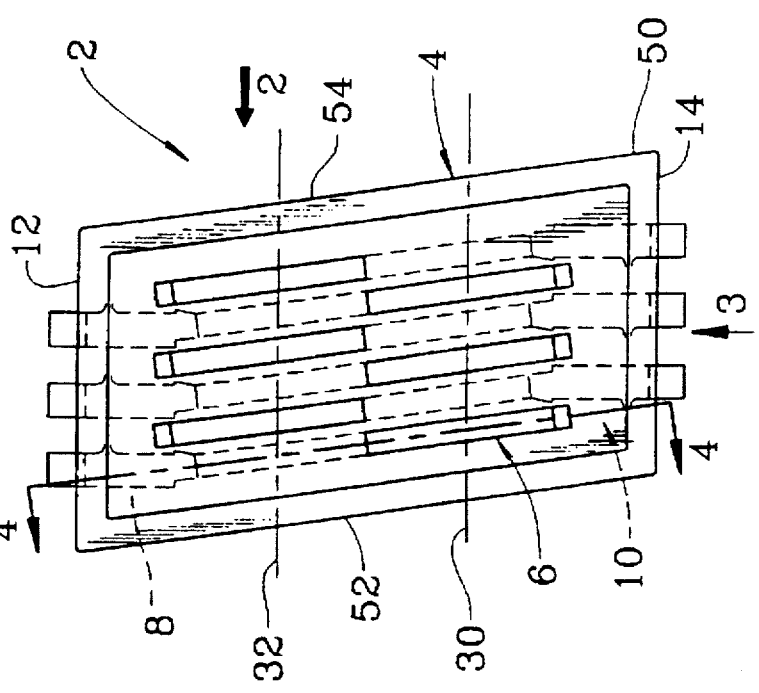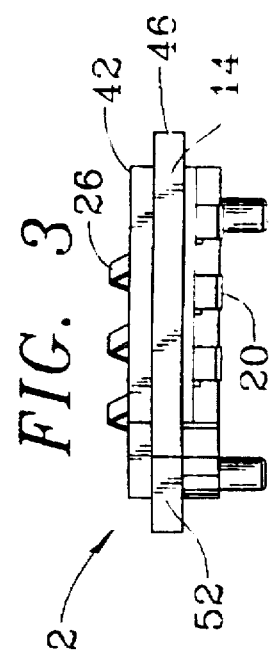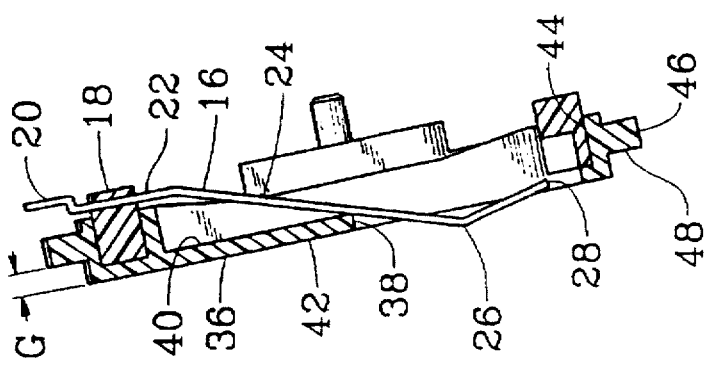

SIM CARD CONNECTOR

BACKGROUND OF THE INVENTION

1. Field of the Invention

This invention relates to a compact electrical connector for making contact to a SIM card.

SIM (system identity module) cards are increasingly used in mobile telephones. The SIM card comprises an electronic chip that supplies the telephone with information identifying the user, whereby without the SIM card the telephone is inoperational. The SIM card may be removed and replaced with another SIM card for example when different users have access to the same telephone The SIM card my also be removed from the telephone such that it is inoperational the case of theft.

2. Summary of the Prior Art

WO-A 204 688 discloses a SIM card connector for mounting on a printed circuit board, comprising a housing bounded by a rectangular periphery comprising opposed sides extending between opposed ends, and a plurality of terminals, each comprising a longitudinal spring beam section and a contact protrusion, the contact protrusions being arranged in two rows along both ends, and the spring beam sections extending therefrom at an angle less than 90° with respect to the row, such that the contact protrusions make contact with two parallel rows of aligned SIM card circuit pads.

Due to the rising demand for decreasing the size of electrical components for miniaturization of mobile telephones or other electronic apparatus, and the continuous addition of supplementary functions, it is desirable to produce a very compact SIM card connector. One important compactness requirement is the surface area the connector uses on a PC board, as it is desirable to position as many electronic components thereon as possible.

It is of course also desirable to provide SIM card connectors that are very cost-effective and easily integrated into different mobile telephone designs or other electronic apparatus. Due to the latter, simplicity of the design is very important.

It is therefore an object of this invention to provide a SIM card connector that is compact and cost-effective to produce and to assemble in a receiving device.

It is a further object of this invention to provide a simple SIM card connector for mounting on a printed circuit board, the SIM card connector using minimum surface area on the PCB.

The objects of this invention have been achieved by providing A SIM card connector for mounting on a PCB comprising a housing bounded by a periphery comprising; opposed sides extending between opposed ends, and a plurality of terminals, each terminal comprising a longitudinal spring beam section and a contact protrusion, the contacts being arranged in a row along one of the ends at least, and the spring beam sections extending therefrom at an angle lees than 90° with respect to the row such that the contact protrusions thereof make electrical contact with two parallel rows of aligned SIM card circuit pads, wherein the terminals are disposed in two rows, a first row extending from one end (12) of the connector, and a second row extending from the other opposed end (14), the terminals of both rows being interleaved with each other, and wherein the sides are substantially parallel to the angled spring beam sections for a minimal usage of PCB surface area.

The preferred embodiment of this invention will now be described in more detail with reference to the figures, whereby;

FIG. 1 is a top view of a SIM card connector;

FIG. 2 is a view in the direction of arrow 2 of FIG. 1;

FIG. 3 is a view in the direction of arrow 3 of FIG. 1; and

FIG. 4 is a cross-sectional view through lines 4—4 of FIG. 1.

Referring to FIGS. 1–4, a SIM card connector 2 comprises an insulative housing 4 and terminals 6 for making contact to pads of a SIM card (not shown). The terminals 6 are disposed in two interleaving terminal sets 8 and 10 extending respectively from a first connector end 12 and a second connector end 14 opposed thereto.

The terminal sets 8, 10 comprise respectively, a plurality of juxtaposed contact arms 16 held together by an overmoulded insulative support member 18. The contact arms 16 comprise a connection portion 20 at one end for extending into a resilient spring beam portion 24 which extends into a contact protrusion 26 for making contact against a SIM card (not shown), the contact protrusion 26 proximate a free end 28 of the contact arms. The contact protrusions 26 of the first set 8 are aligned along a first line 30 for making contact to a first row of contact pads on the SIM card, and the second set 10 of juxtaposed terminals have contact protrusions 26 aligned along a second line 32 for making contact to a second row of contact pads of the SIM card. Because the rows of contact pads on the SIM card are aligned with each other, the terminals of the first and second sets 8, 10 are angled with respect to the parallel contact lines 30, 32 at an angle less than 90° such that the contact arms of the first set 8 can access the first row of contact pads along the line 30, whilst the second set 10 similarly can reach the second row of contact pads along the line 32. For a most compact arrangement, the terminal sets 8, 10 extend from opposed ends 12, 14 and interleave, which enables the resilient spring beam 24 to be of sufficient length for the required flexibility and elasticity.

The housing 4 comprises a top wall 36 having longitudinal cutouts 38 that communicate with terminal receiving recesses 40 for allowing the contact protrusions 26 to project therethrough beyond an upper surface 42 of the top wall 36. The housing further comprises support member receiving recesses 44 for receiving the terminal support members 18 for secure attachment of the terminal sets 8 and 10 to the housing 4. Surrounding the housing 12 is a ledge 46 having an upper surface 48 offset from the upper surface of the top wall 36 by a distance G. The ledge 46 serves to receive the edge of a panel cutout that rests on the upper surface 48, but allows passage of the top wall 36 therethrough. This panel, for example, would define one of the guide surfaces of a slot for slidably receiving the SIM card therein.

The housing 4 is surrounded by an outer periphery 50 that comprises the first connector end 12 and the second connector end 14, and sides 52, 54 that extend between the ends 12 and 14, and which are substantially parallel to each other. The sides 52, 54 are disposed at substantially the same angle as the contact beams 24, in a manner non-orthogonal to the contact lines 30, 32, such that the surface area defined by the periphery 50 is minimal.

The latter is particularly advantageous as the connector is extremely compact and requires minimal surface area when mounting to a printed circuit board, such that the packing density of other components thereon can be increased.

Overmoulding of the support attachment portions of the terminals 6 by a support member 18, provides a means of strongly and precisely holding the terminals 6 together in sets 8, 10 which can then be easily handled and assembled to the housing 4. The low number of components to be assembled, and the minimal surface area requirement due to the angled sides 52, 54 means that this SIM card connector is cost-effective, compact and easily implemented in the design of a receiving electronic device.

I claim:

1. A SIM card connector for mounting on a PCB comprising a housing bounded by a periphery comprising opposed sides extending between opposed ends, and a plurality of terminals, each terminal comprising a longitudinal spring beam section and a contact protrusion, the terminals being arranged in a row along one of the ends at least, and the spring beam sections extending therefrom at an angle less than 90° with respect to the row such that the contact protrusions thereof make electrical contact with two parallel rows of aligned SIM card circuit pads, wherein the terminals are disposed in two rows, a first row extending from one end of the connector, and a second row extending from the other opposed end, the terminals of both rows being interleaved with each other, and wherein the sides are substantially parallel to the angled spring beam sections for a minimal usage of PCB surface area.

2. The connector of claim 1 wherein the terminals of each row are rigidly fixed together by an overmoulded support portion, thereby forming a terminal set.

3. The connector of claim 2 wherein the two terminal sets are identical.

4. The connector of claim 2 wherein the housing has a pair of cavities, each proximate one of the corresponding connector ends for receiving and securely holding the support portions therein.

5. The connector of claim 1 wherein the housing has an upper SIM card receiving surface beyond which the contact protrusions project for contacting a SIM card positioned substantially against the surface, the housing further comprising a ledge adjacent the periphery and offset from the surface for receiving the edge of a panel cutout thereagainst.

6. The connector of claim 1 wherein the connector ends are substantially parallel to the rows of contact protrusions such that the periphery is substantially the shape of a rhombus.

* * * * *